Nov. 10, 1936.    J. E. GOLOB    2,060,301
THERMOSTATICALLY OPERATED VALVE DEVICE
Original Filed Oct. 12, 1933

INVENTOR.
John E. Golob.
BY *Slough and Canfield*
ATTORNEY.

Patented Nov. 10, 1936

2,060,301

UNITED STATES PATENT OFFICE 2,060,301

THERMOSTATICALLY OPERATED VALVE DEVICE

John E. Golob, Cleveland, Ohio, assignor to The Bishop & Babcock Mfg. Company, Cleveland, Ohio, a corporation of Ohio Original application October 12, 1933, Serial No. 693,301. Divided and this application April 19, 1934, Serial No. 721,328

8 Claims. (Cl. 236—34)

This invention relates to thermostatically operated valve devices and particularly to such devices for controlling flow of fluid through a fluid conduit means in response to changes of temperature of the fluid.

While my invention may be variously applied to practical uses, it has particular advantages when applied to control the rate of flow of water or other cooling medium in the cooling system of an internal combustion engine.

An object of the invention is to provide an improved thermostatically controlled valve device for fluid circulatory systems wherein relatively high fluid pressures are encountered, to control flow in the system commensurably with temperature of the fluid.

Another object is to provide an improved thermostatic valve device for controlling the circulating cooling medium of an internal combustion engine and adapted to provide the minimum of resistance to fluid flow when the valve is in the maximum flow position.

Another object is to provide an improved thermostatically operable valve device having a valve element movable to valve-open and valve-closed positions in response to temperature changes of the valve controlled fluid and provided with improved means to permit flow through the valve when in closed position upon the attainment of fluid pressure above a predetermined value.

Other objects will be apparent to those skilled in the art to which my invention appertains.

My invention is fully disclosed in the following description taken in connection with the accompanying drawing, in which.

Figure 1:
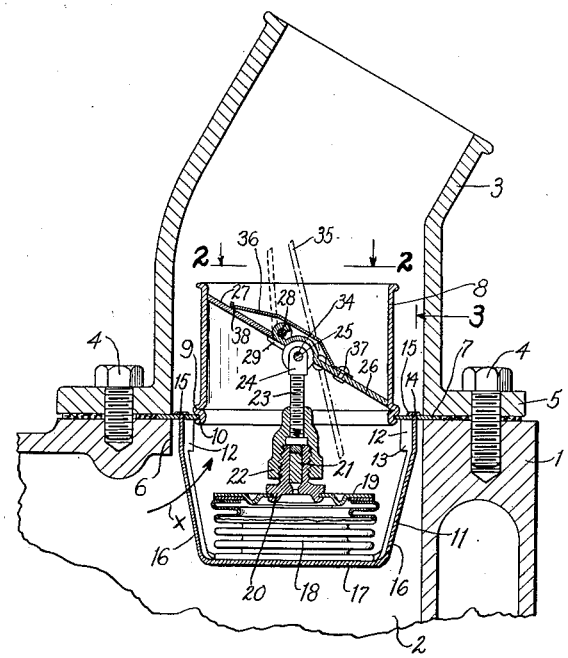
Fig. 1 is a longitudinal sectional view of an embodiment of my invention as installed upon an internal combustion engine.
Figure 3:
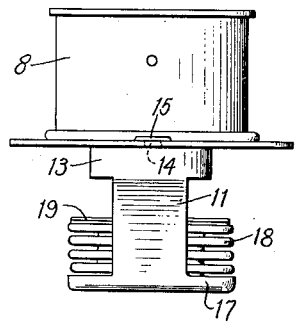
Fig. 3 is an elevational view taken generally from the plane 3—3 of Fig. 1.
Figure 2:
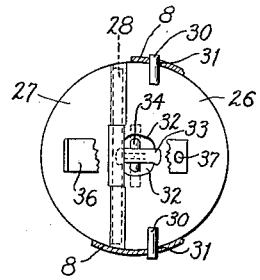
Fig. 2 is a fragmentary sectional view taken from the plane 2—2 of Fig. 1 with parts broken away for clearness.

Referring to the drawing, at 1 is represented a part of the head of an internal combustion engine having water jacket passageways therein one of which is shown at 2 through which cooling water may be forceably circulated by a pump not shown but well known in this art. Mounted upon the head 1 at an upper portion thereof is a hose connection head 3 secured upon the head 1 by bolts 4—4 projected through suitable perforations in an outwardly extending flange 5 of the hose connection head and threaded into the head 1.

The head 1 is provided with a port 6 leading from the water jacket passageway 2 into the hose connection head 3. Thus water may be caused to flow from the water jacket passageway 2 in the direction of the arrow X through the port 6, and by way of the hose connection head 3 to the engine radiator, and the flow may be controlled by the valve mechanism to be described.

The valve mechanism comprises an annular flange element 7 of sheet metal upon which the parts of the mechanism are supported. The flange element is adapted to be clamped between the flange 5 of the hose connection head 3 and the engine head 1, the flange 7 being preferably planar and the flange 5 and head 1 being provided with corresponding planar faces whereby the joint thus effected is sealed.

The working parts of the mechanism are carried upon a frame of which the flange element 7 is one element. Secured to the inner periphery of the flange element 7 is a vertically disposed generally cylindrical tubular valve seat portion 8 which may be secured at its lower end to the flange element 7 in any suitable manner as for example by forming an outwardly projecting annular bead 9 in the sheet metal of the tubular portion 8, adjacent the lower end thereof as viewed in the drawing, and resting this bead as a shoulder upon the upper side of the inner periphery of the annular flange element 7, and then spinning the lower end of the tubular portion 8 as at 10 around and upon the under side of the flange element 7.

A sheet metal stirrup 11 is suspended from the flange element 7 and comprises diametrically opposite generally vertical portions 12—12 having enlarged end portions 13 at their upper ends and upwardly terminating in shank portions 14—14 inserted through suitable perforations in the flange element 7 and being, upwardly of the flange element 7, riveted over as at 15—15. By this means the portions 15—15 serve as rivets to draw the enlarged portions 13—13 rigidly against the under side of the flange element 7, rigidly supporting the stirrup 11 upon the flange element. Thus, in a simple manner, a rigid assembly of the stirrup 11, flange element 7 and tubular valve seat portion 8 is effected.

The lower ends of the vertical portions 12—12 of the stirrup continue as integral inwardly downwardly inclined hanger portions 16—16 joined at their lower extremities to a preferably integral disc 17 upon which is sealedly supported the lower end of a bellows thermostat 18. The upper end of the bellows 18 is sealed by a disc 19. At the center of the upper disc 19 is sealedly secured an upwardly extending tubular externally threaded stud 20 through the bore of which the interior of the bellows may be charged with a suitable quantity of a suitable liquid responsive to vaporize and create pressure within the bellows at predetermined higher temperatures normally encountered in the cooling fluid of an internal combustion engine. After thus charging the bellows, the tubular stud 20 may be sealed by a plug 21 of well known construction. Upon the threaded stud 20 is a nut 22 adjustably positionable thereon by rotating it. The upper portion of the nut 22 is threaded upon a rod 23 having on its upper end a head 24 having therethrough a transverse perforation 25.

The threads of the stud 20 are opposite in direction to those of the rod 23 and therefore upon turning the nut 22, a turnbuckle action is effected to adjustably propel the rod 23 upwardly or downwardly for a purpose to be described.

A pair of flat complementary sheet metal valve elements 26 and 27 are mounted within the tubular valve seat portion 8 at an inclination to the axis thereof. The two valve elements are hingedly connected together by bending adjacent edges thereof around a pintle pin 28; and the periphery of the valve elements 26 and 27 is formed to engage the inner wall of the tubular valve seat portion 8 and thus the peripheries of the elements 26 and 27 are generally elliptical. But the pintle 28 is disposed at one side of the axis of the tubular portion 8 and therefore the valve element 26 is larger than the valve element 27.

A lug 29 on the valve element 27 prevents relative rotation of the two elements downwardly as viewed in Fig. 1 beyond a common plane.

The valve element 26 is provided with a pair of axially aligned trunnions 30—30 preferably formed from round bar stock and adapted to be projected through suitable aligned perforations 31—31 in the wall of the tubular portion 8 to provide an oscillatory axis for the two valve elements.

The material of the flat sheet metal valve element 26 is provided with two depressions 32—32 in the upper face thereof providing therebetween an upwardly extending rib 33 downwardly concave.

The head 24 of the rod 23 is projected upwardly into the hollow rib 33 and a pivot pin 34 is projected laterally through aligned perforations in the side walls of the depressions 32—32 and through the bore 25 of the head 24.

By the construction thus far described, upon vertical reciprocation of the rod 23 caused by contraction and expansion of the bellows 18 in response to changes of temperature of liquid in the water jacket passageway 2, the valve elements 26 and 27 may be oscillated around the axis of the trunnions 30—30 to the closed solid line position illustrated, or respectively, to the open broken line position 35. In this connection it may be stated that the bellows 18 being suspended into the water jacket passageway 2, will be at all times subjected to the temperature thereof.

A spring 36, preferably of the flat sheet metal type, is riveted as at 37 to a portion of the valve element 26 on the upper face thereof and is bent to bridge over the central portion of the valve element 26 and over the hinge connection having the pintle 28; and to resiliently engage the upper surface of the valve element 27 as shown at 38. The valve element 27 is restrained against rotation under the impulsion of the spring by the lug 29 above referred to.

The two valve elements 26 and 27 thus normally may move in unison when they have once been moved from the closed position. The valve element 27, however, performs another function which will now be described.

It will be observed that when the valve elements 26 and 27 are in the solid line closed position illustrated in Fig. 1, the passageway through the tubular element 8 is completely closed. If now the pressure of the water circulating pump of the cooling system should raise the pressure in the jacket of the engine to a predetermined value, such as 15 pounds per square inch, this pressure on the lower side of the valve element 27 may rotate it around the pintle pin 28 against the tension of the spring 36 and open a relatively small passageway through the tubular element 8 to permit a restricted circulation through the radiator.

The size of the valve element 27 may be predetermined to restrict this flow to any desired amount. Thus the valve element 27 may relieve pressure in the system above a predetermined value and has the additional advantage that as the cooling water increases in temperature, this temperature is communicated to the bellows 18 by the circulation effected through the valve element 27 to cause it to operate and open the valve element 26 before the temperature at any part of the engine becomes excessive.

Thus, as will now be clear, when the cooling water of the engine is below a predetermined temperature, the valve elements 26 and 27 will close the tubular portion 8 and stop flow through the radiator; and that when the temperature rises to a predetermined value, the bellows 18 will rock the valve elements 26 and 27 around the trunnion supports 30—31 and permit the water to flow to the radiator. But at any time, if the water pressure in the system rises above a predetermined value, whether the valve elements 26 and 27 are in the closed position or not, the valve element 27 will be rocked around the pintle 28 to provide a predetermined restricted circulation through the radiator. The position of the valve elements 26 and 27 may be adjusted to close the tubular portion 8 at any desired predetermined temperature by rotating the nut 22 effecting the said turnbuckle action thereof and bodily moving the rod 23 upwardly or downwardly to adjustably rock the valve elements around their trunnion supports.

My invention is not limited to the exact details of construction illustrated and described inasmuch as my invention may be embodied in various modifications of such structure without departing from the spirit of my invention or sacrificing its advantages.

This application is divisional from my application Serial No. 693,301, filed October 12, 1933, for improvements in Thermostatically operated valves.

I claim:

1. In a thermostatic valve mechanism, in combination, means providing a fluid flow passageway, a butterfly valve in the passageway supported to oscillate on a transverse axis to control flow through the passageway, the portion of the valve at one side of the axis being of greater area than the portion at the other side to cause the valve to tend to be opened by fluid approach pressure, the valve comprising a main part and a supplemental part hinged together on a second transverse axis, the two parts being movable together in unison to control flow, a spring carried wholly by the valve resisting separate hinging movement of the supplemental part, the supplemental part constituting part of the said large area valve portion and movable against the spring resistance in the valve opening direction at approach pressure above a predetermined maximum value, a stop opposing movement of the supplemental valve part in the other direction, the said spring being a leaf type spring secured to one valve part and bridging the hinged connection and yieldably engaging the other valve part, and a thermostat disposed at the aproach side of the passageway and having a movable portion pivotally connected to the valve main part to move it responsive to changes of fluid temperature.

2. In a thermostatic valve mechanism, a tubular body, an annular flange extending laterally therefrom, a U-shaped frame supported by its open end on opposite portions of the flange and supporting in the closed end a bellows thermostat, a generally flat elliptical valve comprising a pair of valve elements hinged together on a transverse axis and disposed within the tubular body and oscillatably supported therein by trunnion elements on one valve element projected through perforations in the wall of the tubular body, the valve adapted when oscillated in one direction to close the tubular element and in the other direction to open it, a rod element connected at one end to the bellows and at the other end pivotally connected to the trunnion supported valve element at a point at one side of the trunnion axis, and adapted to oscillate the valve upon thermally effected expansion and contraction of the bellows, a spring secured to one valve element and engaging the other tending to hingedly move it, and a stop on one valve element engaging the other valve element preventing spring-impelled hinging movement in one direction.

3. In a thermostatic valve mechanism, an element providing a flow passageway, a valve element controlling flow therethrough, a thermostat disposed forwardly of the valve element at the fluid approach side thereof and comprising a movable element associated with the valve element to controllingly move it in response to changes of temperature of the thermostat, the valve element comprising means movable independently of the movable element to open responsive to fluid pressure in the flow passageway above a predetermined amount.

4. A fluid flow controlling thermostatic valve mechanism of unitary construction comprising a tube, a butterfly valve plate pivoted within the tube intermediate the ends thereof and adapted in closed position to take an oblique position relative to the axis of the tube and when in open position to take a less oblique position relative thereto, a bellows type thermostat carried in longitudinal alignment with the bore of said tube at the approach side thereof, means interconnecting a movable end of said bellows and said plate to effect rotational movement of said plate on its pivot responsive to variations in temperature imparted by fluid surrounding said bellows, said plate comprising a pair of relatively movable portions, one of said portions adapted to move independently of the other portion responsive to an excess beyond a predetermined fluid pressure on the approach side of said valve to permit a limited flow of fluid through said tube.

5. In a thermostatic valve mechanism, an element providing a flow passageway, a valve element controlling the flow therethrough, a thermostat disposed forwardly of the valve element at the fluid approach side thereof and comprising a movable element associated with the valve element to controllingly move it in response to changes of temperature of the thermostat, the valve element comprising two parts hinged together and movable bodily to jointly control flow through the passageway, resilient means carried by the valve element yieldingly opposing movement of one valve element part relative to the other part, and said one part being yieldably movable relative to the other to open responsive to fluid pressure in the flow passageway above a predetermined amount.

6. In a thermostatic valve mechanism, an element providing a flow passageway, a valve element controlling the flow therethrough, a thermostat disposed forwardly of the valve element at the fluid approach side thereof and comprising a movable element associated with the valve element to controllingly move it in response to changes of temperature of the thermostat, the valve element comprising two parts hingedly connected together, one of the parts being oscillatably mounted in the flow passageway and both parts oscillatable together to control flow through the passageway, a spring connected to one valve part and supported solely thereby and spanning the hinged connection and reacting on the other part tending to move one valve part relative to the other, and the spring permitting relative movement of the one part with respect to the other of said parts upon the occurrence of a predetermined pressure.

7. A fluid flow controlling thermostatic valve mechanism of unitary construction comprising a tube, a butterfly valve plate pivoted within the tube intermediate the ends thereof and adapted in closed position to take an oblique position relative to the axis of the tube and when in open position to take a less oblique position relative thereto, a bellows type thermostat carried in longitudinal alignment with the bore of said tube at the approach side thereof, means interconnecting a movable end of said bellows and said plate to effect rotational movement of said plate on its pivot responsive to variations in temperature imparted by fluid surrounding said bellows, said plate comprising a pair of relatively movable portions hingedly connected together, one of said portions supporting a spring resiliently engaging the other portion to adapt the other portion to move independently of the one portion responsive to an excess beyond a predetermined fluid pressure on the approach side of said valve to permit a limited flow of fluid through said tube.

8. In a thermostatic valve mechanism, in combination, a conduit, a butterfly valve in said passageway supported to oscillate on a transverse axis to control the flow of a fluid through said conduit along which the fluid approaches the valve to the portion of said conduit along which said fluid, after passing the valve recedes from said valve, the portion of the said valve on one side of a plane through said axis being of a greater area than the portion of said valve on the opposite side of said plane, a complementary portion of said valve to one side of said axis first mentioned being hinged to the remaining complementary portion of said valve along an axis parallel to said first axis mentioned, a spring supported exclusively by said valve, a stop element fixed with respect to said complementary portion of said valve, said stop being located to prevent said first mentioned complementary portion from rotating in a given direction about said axis last mentioned beyond a given point, said spring being secured to said valve to maintain said first mentioned complementary portion biased toward said stop, whereby when said valve is closed, when the pressure of said fluid on the approach side of said valve exceeds a given value the biasing pressure is overcome and said first complementary portion of said valve is opened and the fluid allowed to pass through said valve—and a thermostat located on the approach side of said valve in said conduit and having a movable element pivotally connected to the said portion of said valve of greater area whereby said valve may be moved as a whole about said axis first mentioned, responsive to changes in the temperature of said fluid.

JOHN E. GOLOB.